United States Patent [19]
Paya

[11] Patent Number: 5,725,334
[45] Date of Patent: Mar. 10, 1998

[54] CUTTING INSERT

[75] Inventor: José Agustin Paya, Mühlheim, Germany

[73] Assignee: Widia GmbH, Essen, Germany

[21] Appl. No.: 822,477

[22] Filed: Mar. 24, 1997

Related U.S. Application Data

[63] Continuation of Ser. No. 530,144, filed as PCT/DE94/000274 Mar. 11, 1994, abandoned.

[30] Foreign Application Priority Data

Mar. 29, 1993 [DE] Germany ............... 43 10 131.3

[51] Int. Cl.$^6$ .................................................. B23B 27/08
[52] U.S. Cl. ........................ 407/117; 407/116; 407/104
[58] Field of Search .......................... 407/113, 114, 407/115, 116, 117, 104

[56] References Cited

U.S. PATENT DOCUMENTS

| | | | |
|---|---|---|---|
| 4,606,678 | 8/1986 | Zweekly | 407/114 |
| 4,778,311 | 10/1988 | Niemi | 407/116 |
| 4,844,668 | 7/1989 | Pettersson | 407/117 |
| 5,076,739 | 12/1991 | Pano | 407/116 |
| 5,078,550 | 1/1992 | Satran et al. | 407/113 |
| 5,375,948 | 12/1994 | Lindstedt | 407/116 |
| 5,411,354 | 5/1995 | Gustafsson | 407/104 |
| 5,423,639 | 6/1995 | Wiman | 407/116 |

FOREIGN PATENT DOCUMENTS

| | | |
|---|---|---|
| 0 065 124 B1 | 11/1982 | European Pat. Off. . |
| 0 245 225 A2 | 11/1987 | European Pat. Off. . |
| 0 312 223 A1 | 4/1989 | European Pat. Off. . |
| 0 349 871 A1 | 1/1990 | European Pat. Off. . |
| 0 467 872 A1 | 1/1992 | European Pat. Off. . |
| 0 507 250 A1 | 10/1992 | European Pat. Off. . |
| 2 227 927 | 11/1974 | France . |
| 1119783 A | 10/1984 | U.S.S.R. . |
| 1414509 A1 | 8/1988 | U.S.S.R. . |
| 1602615 A1 | 10/1990 | U.S.S.R. . |

OTHER PUBLICATIONS

Vol. 10 No. 29 (M–451) Feb. 5, 1986 Abstract 60–186311 (A) published 21 Sep. 1985.

*Primary Examiner*—Daniel W. Howell
*Assistant Examiner*—Mark Williams
*Attorney, Agent, or Firm*—Herbert Dubno; Andrew Wilford

[57] ABSTRACT

A cutting insert is formed with a plurality of cutting edges, a cutting surface spaced inward from the cutting edges, and a continuous land having an outer periphery at the cutting edges and a curved inner periphery spaced inward therefrom and outwardly delimiting the cutting surface. The land dips at the inner periphery generally centrally of each edge toward the surface and thereby forms generally centrally of each edge at the inner periphery a region of minimal height above the surface.

15 Claims, 7 Drawing Sheets

CUTTING INSERT

CROSS REFERENCE TO RELATED APPLICATIONS

This application is a file-wrapper continuation of U.S. patent application Ser. No. 08/530,144 filed 20 Sep. 1995 as the U.S. national phase of PCT application PCT/DE94/000274 filed 11 Mar. 1994 with a claim to the priority of German application P 43 10 131.3 filed 29 Mar. 1993.

FIELD OF THE INVENTION

The invention relates to a cutting insert with a negative cutting-surface land at the cutting edges in particular for radial machining such as tapping, cut-off turning, rotary cut-off turning, milling, or cutting screwthreads and also for turning.

BACKGROUND OF THE INVENTION

Negative lands of cutting inserts have the advantage of stabilizing the cutting edge along with the disadvantage that chip outfeed is strongly inhibited so that there is substantial friction which requires considerable feed force.

OBJECT OF THE INVENTION

It is an object of the invention to improve on the above-described cutting insert so that without losing the advantages of a negative cutting-surface land the feed force or the resulting overall cutting force is reduced.

SUMMARY OF THE INVENTION

This object is achieved by a cutting insert wherein the width of the cutting-surface land relative to the effective cutting region is maximum in at least one cutting edge corner or in the region of a round main cutting edge. The land thus is restricted as it goes from one cutting corner along the cutting edge and the restriction can be in an extreme case down to zero. Such a restriction minimizes the height created by the negative land angle of the border between the cutting-surface land and the cutting surface relative to the cutting edge. This dropping of the cutting-surface land along a cutting edge results in less wear of the out-flowing chip and thus takes a load off the cutting wedge without giving up the advantages of a negative wide stable land in the cutting-edge corners. The cutting edge is thus substantially better supported in the cutting corners, that is in the regions of greatest cutting force, than in the regions of the secondary cutting edges.

Thus the border between the cutting-surface land and the cutting surface extends generally arcuately. This is an embodiment wherein the described border runs relative to a straight connecting line of the border points in the cutting corners underneath this connecting line. Preferably the border of the cutting-surface land to the cutting surface or the width of the cutting-surface land from the cutting edge runs through a minimum in the direction of the cutting edges.

The cutting-surface land angle can have one and the same value along the entire cutting edge, and it can also have different negative land angles to achieve a further compensation of the slope which an outfeeding chip must run up. According to a concrete embodiment the land angle changes continuously along the cutting edge, preferably going continuously toward zero but always staying negative.

According to a further embodiment of the invention the border between the cutting-surface land and the cutting surface is of wavy and/or zig-zag shape, at least one of the upper or of the lower containing curves forming an arc with uniform curvature. Unlike in the above-described case it is not strictly necessary that the border have a single curvature from cutting corner to cutting corner as it goes through its minimum, instead the border can be irregularly wavy or run as a zig-zag, above all then at least one of the upper or of the lower containing curves fulfills the requirement of an arcuate path with a single curvature.

A preferred embodiment of the invention is a tapping tool with a main cutting edge and two secondary cutting edges with a circumferential cutting-surface land which is larger in the two cutting corners as in the adjacent regions, except if necessary for the rear region of the secondary cutting edge that is irrelevant for the cutting operation. Preferably the main-cutting surface land between the adjacent cutting corners and/or the secondary cutting-surface lands are formed symmetrically relative to a longitudinal central axis of the tapping tool and/or a perpendicular thereto.

According to a further embodiment of the invention various shapes are particularly advisable for the cutting-surface land seen perpendicular to the cutting edge: The cutting-surface land can be straight, slightly concave or convexly curved and/or formed with one or more chip-forming grooves and/or with one or more chip-forming elements. In this application land means such regions adjacent the cutting edge that are curved with a depth or height of $1/100-10/100$ mm.

According to a further embodiment of the invention a chip-guiding step can be provided adjacent the cutting-surface land or the cutting surface can be provided with a raised chip breaker with a projecting rib-shaped width with seen in top view as well as in longitudinal section a tapering point. All these additional chip-forming means are known in principal from prior-art cutting inserts and can also be used in connection with the embodiments of the invention.

According to a further embodiment of the invention the cutting insert is a thread-cutting insert with staggered and stepped cutting corners with the cutting-surface lands each running through a minimum from a projecting cutting corner to a cutting-edge bump.

Preferably with all of the described embodiment the free angle is positive, but it can also be 0°.

The cutting insert an according to a further embodiment of the invention be provided with a circularly closed cutting edge. The border between the negative land and the adjacent cutting surface increase to the cutting edge through varying spacings which run through maximum and minimum levels, preferably four maximums and four minimums. Wedge-shaped longitudinal-rib raised chip-forming elements are provided extending radially from the minimum spacings of the border from the cutting edge.

BRIEF DESCRIPTION OF THE DRAWING

Embodiments of the invention are shown in the drawings. In the drawing.

SPECIFIC DESCRIPTION

Figure 1:
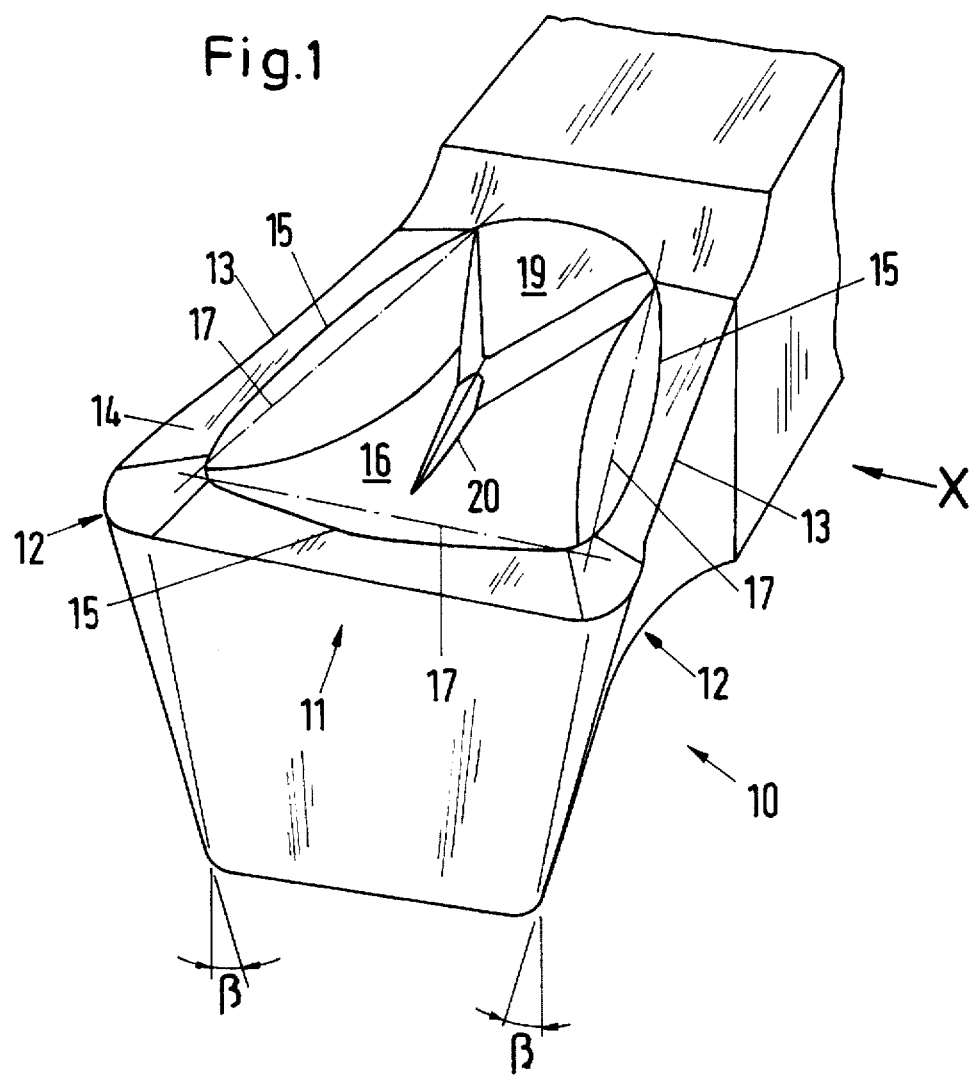
FIG. 1 is a perspective view of a tapping insert.
Figure 2:
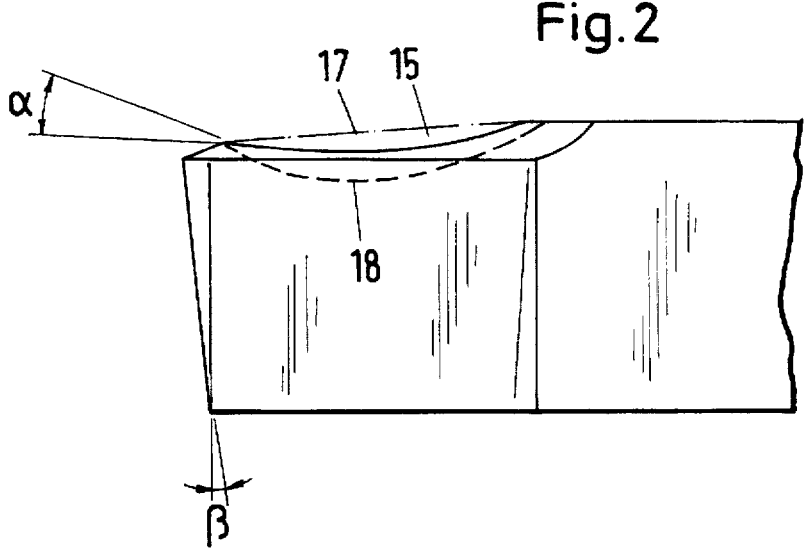
FIG. 2 is a side view taken in the direction of arrow x of FIG. 1.
Figure 3:
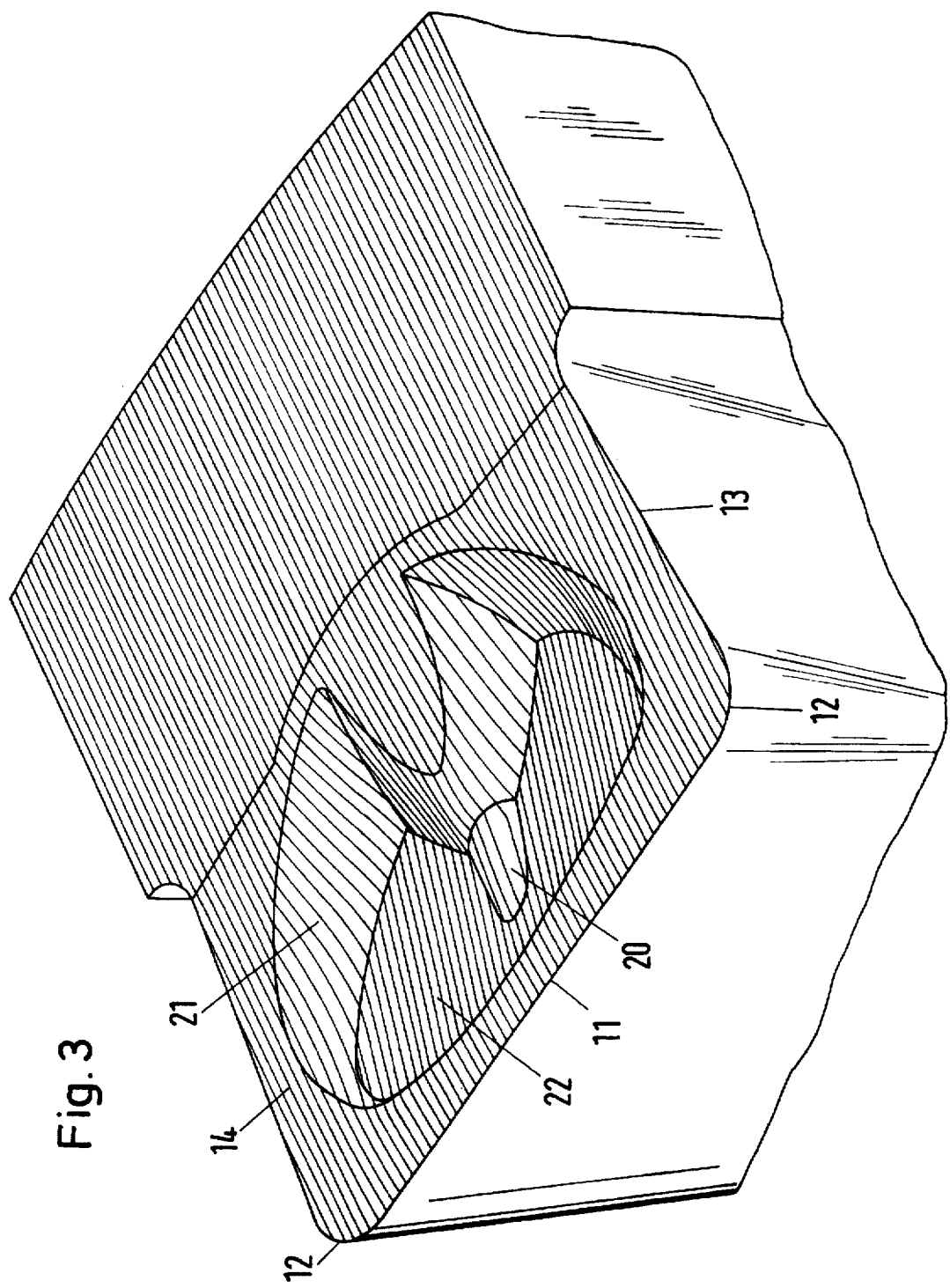
FIG. 3 is a partial perspective side view of a further cutting insert.

The tapping insert 10 according to FIG. 1 has a main cutting edge 11 that is bounded by two cutting corners 12 from which extend respective secondary cutting edges 13 that extend at an acute angle to each other. Immediately adjacent the main and secondary cutting edges there is a land 14 which is of maximum width at the cutting corners 12 and which has restrictions 15 in regions adjacent the main cutting edge 11 and the secondary cutting edges 13. At the rear the cutting land 14 is again wider. If the borders between the cutting land 14 and the cutting surface 16 are joined by straight lines 17, the extent of the restriction, that is the reduction of the cutting-surface land width, becomes evident. The cutting insert has with a negative land angle α (see FIG. 2) a positive free-surface angle β. The cutting surface 16 can be shaped as a recess 18 (see FIG. 2). In addition the cutting surface 16 can also have a chip-shaper 19 which has the shape of a wedge 20 directed perpendicular toward the main cutting edge 11. The cutting insert shown in FIG. 3 is correspondingly constructed where the perspective representation makes it clear that the cutting-land width in the rear where it is not important for the cut is larger than the width of the cutting-surface land in the cutting-corner region. The cutting-surface width in the rear region depends on how much the cutting-surface land or the descending region 21 extends in toward the cutting-surface recess 22 as a chip-forming element.

Figure 4:
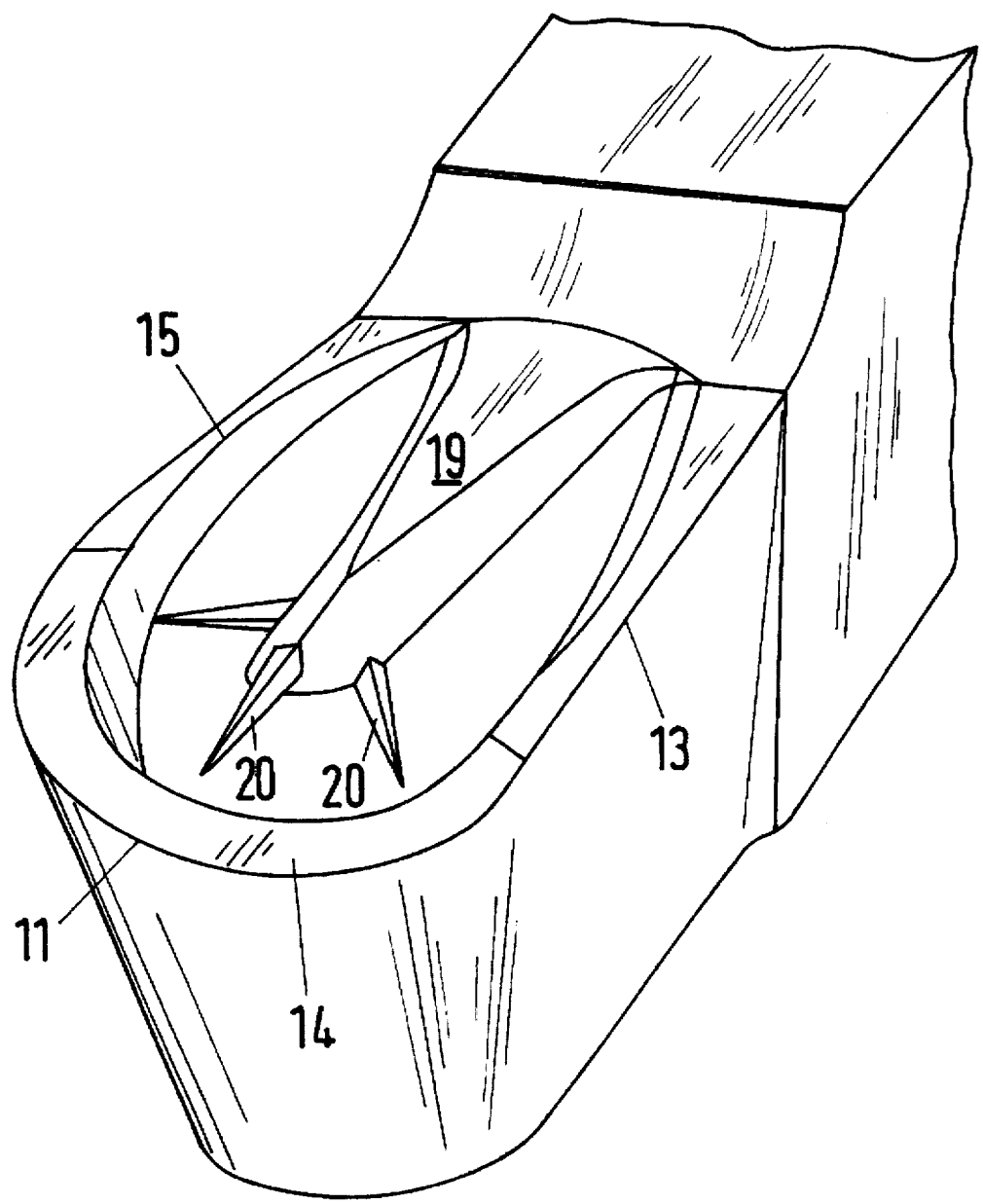
FIG. 4 is a perspective view of a cutting insert with a front rounded cutting edge.

The main cutting edge 11 is rounded in a further embodiment of a tapping insert according to FIG. 4 and merges smoothly into the secondary edge 13. In this embodiment the main cutting edge 11 takes over the function of a cutting corner so that the cutting-surface land 14 has in the region of the main cutting edge a constant thickness. Immediately adjacent in the region of the secondary cutting edge the border between the cutting-surface land and the cutting surface 16 of the respective ramp part is arcuately recessed, that is the cutting-surface land width is smaller in this region of the restriction. Even this cutting insert has an elongated forwardly tapering raised chip-forming element 19 with respective wedge-shaped rib parts 20 that are arranged symmetrically to the longitudinal central axis of the cutting insert. The construction of these edges or longitudinal ribs is the subject of German patent 4,136,471 to which reference is made.

Figure 5:
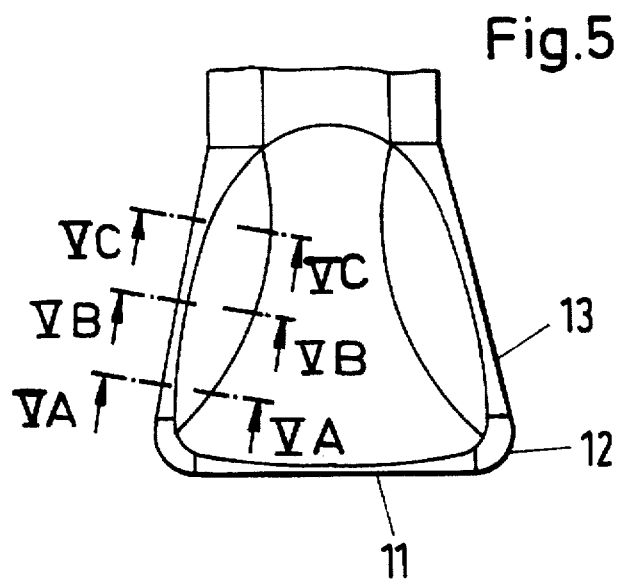
FIG. 5 is a top view of a cutting insert.
Figure 5A:
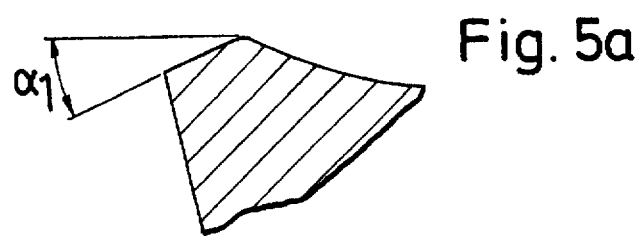
FIGS. 5a, 5b, and 5c are sections taken along lines VA—VA, VB—VB, and VC—VC of FIG. 5.
Figure 5B:
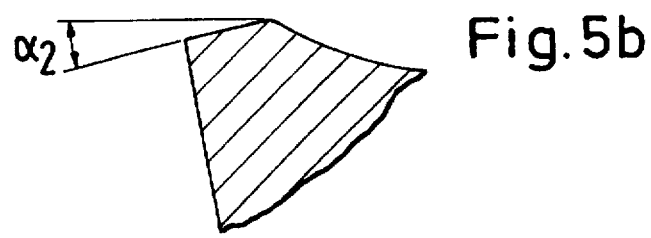
Figure 5C:
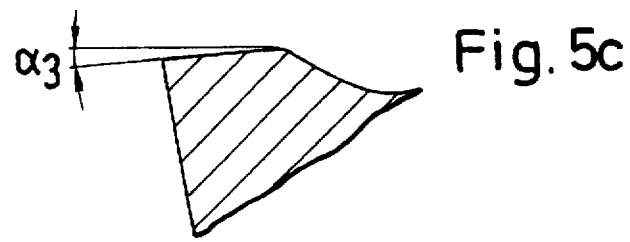

The cutting insert shown in top view in FIG. 5 corresponds generally to the cutting insert according to FIG. 1 (except for the central chip former) but has different land angles $\alpha_1$ to $\alpha_3$ with the land angle decreasing along the secondary edge 13 with increasing spacing from the cutting edge 11. Decreasing the land angle to small absolute values takes place in any case up to the region of the restriction whereupon the angle can stay the same or even increase or go much further negative.

Figure 6:
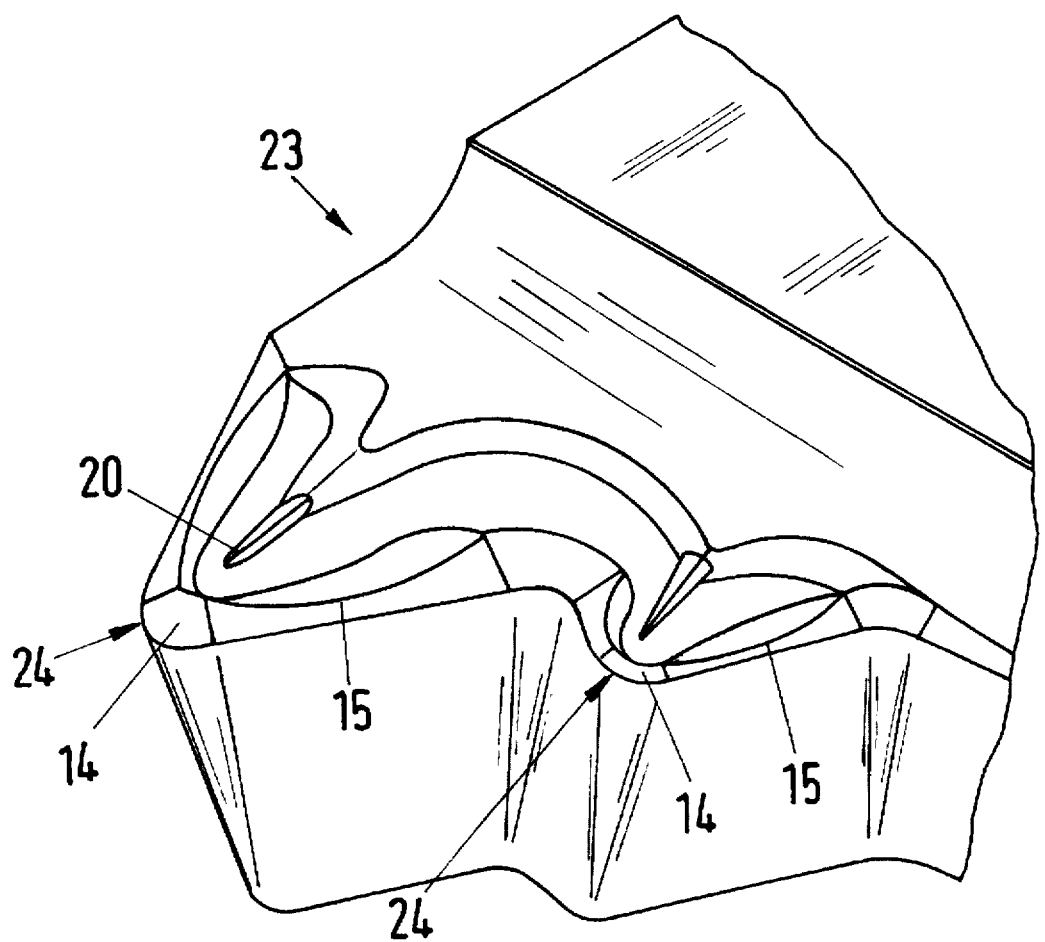
FIG. 6 is a partial perspective view of a screwthread cutting insert.

FIG. 6 shows a thread-cutting insert 23 with several cutting edges 24 that are staggered and adjacent which the cutting-surface land 14 has a maximum width relative to the remaining regions. In addition the same parts have the same references as in the above-discussed figures.

Figure 7:
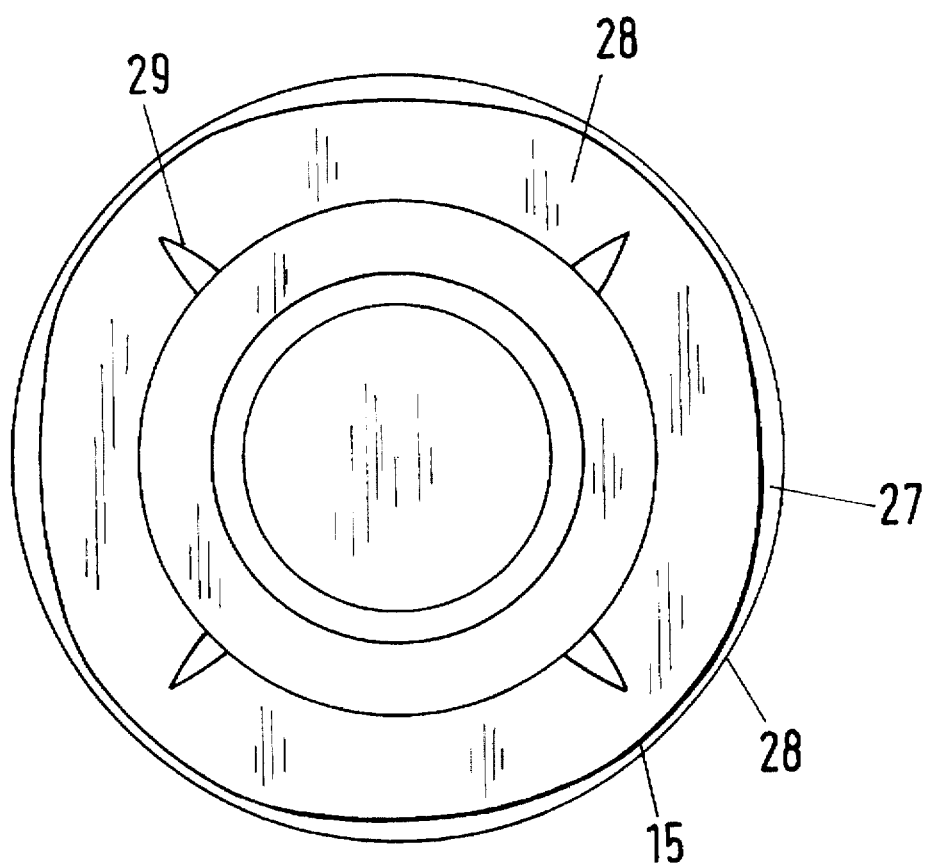
FIG. 7 is a top view of a further cutting insert.
Figure 8:
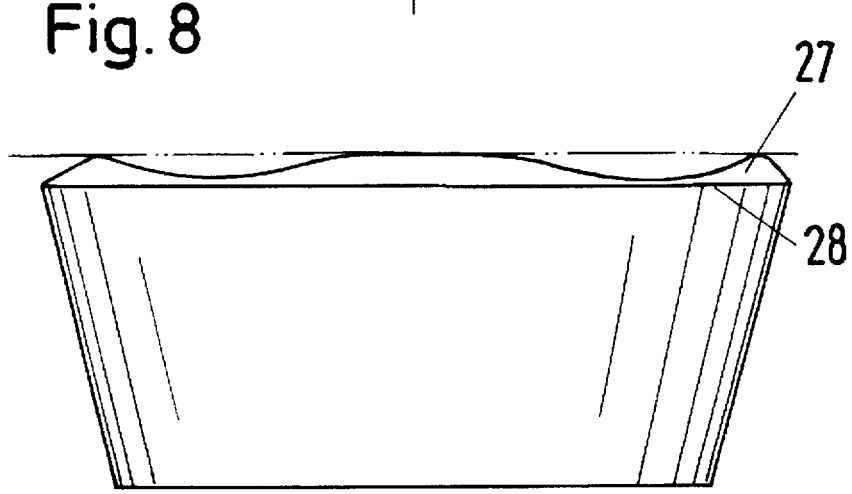
FIG. 8 is a side view of the cutting insert according to FIG. 7.

FIG. 7 shows a top view of a cutting insert with a closed circular cutting edge which has a negative cutting-surface land 27. The cutting-surface land 27 has a varying width such that it assumes maximum width (in the drawing above and below as well as right and left) on opposite sides and runs through a minimum in the regions therebetween. As particularly visible from FIG. 8 the border between the negative land 27 and the remaining cutting surface sinks relative to the surrounding regions. The negative land ends at a chip-guiding groove 28 into which project wedge-shaped radially outwardly directed chip-forming elements 29. These chip-forming elements point to the low parts of the border 15 between the negative land 27 and the remaining cutting surface. Even these wedges or longitudinal ribs are described in German patent 4,136,417 to which reference is made.

FIGS. 9a through 9j show that with the cutting inserts according to the invention different shapes for the cutting-surface lands can be provided.

Figure 9A:
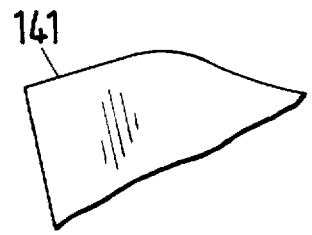
FIGS. 9a, 9b, 9c, 9d, 9e, 9f, 9g, 9h, 9i and 9j are respective embodiments of different lands.
Figure 9B:
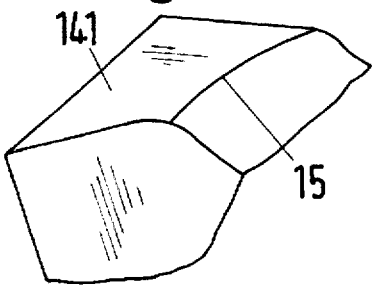
Figure 9C:
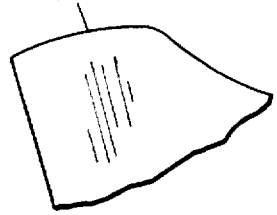
Figure 9D:
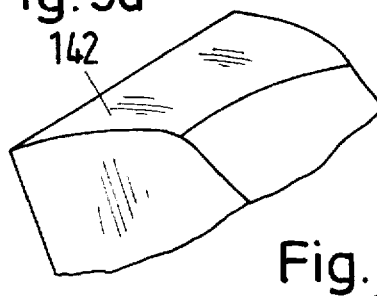
Figure 9E:
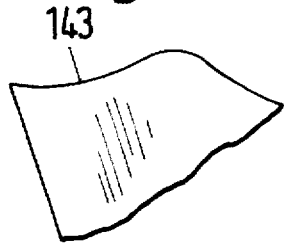
Figure 9F:
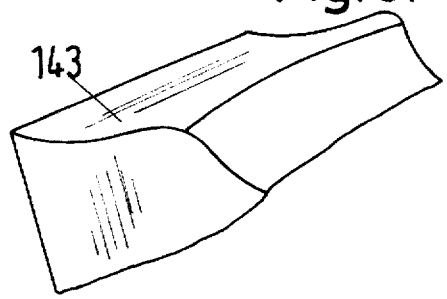
Figure 9G:
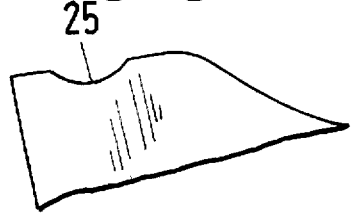
Figure 9H:
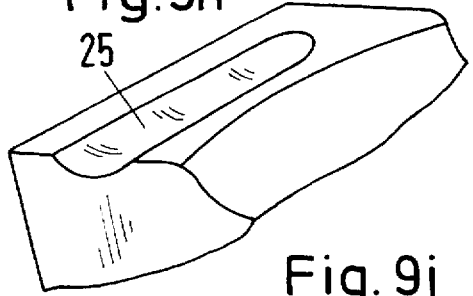
Figure 9I:
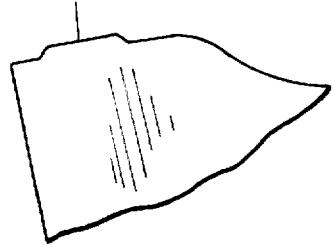
Figure 9J:
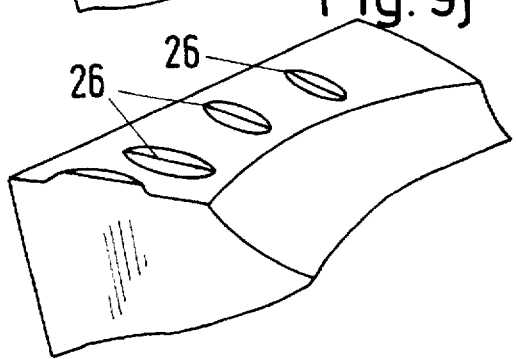

The land according to FIGS. 9a and 9b has a planar flat shape 141 whereas the cutting-surface land according to FIGS. 9c and 9d has a lightly convexly curved shape 142 (the curvature is shown exaggerated and in practice has 1/100 to 10/100 mm height differential). The cutting-surface land according to FIGS. 9e and 9f has a concave shape 143 with a convexity of 1/100 to 10/100 mm depth. The above-named cutting-surface shapes can be combined with grooves 25 in the region of the cutting-surface land. In addition according to FIG. 9i and 9j it is possible to use raised chip-forming elements 26 on the cutting-surface land 14, preferably perpendicular or at an acute angle to the cutting edge and shaped as elongated wedge-shaped ribs.

I claim:

1. A cutting insert formed with:

a plurality of cutting edges each having a center;

a cutting surface spaced inward from the cutting edges; and a continuous land having an outer periphery at the cutting edges and a wholly curved and nonstraight inner periphery spaced inward therefrom and outwardly delimiting the cutting surface, the land dipping at the inner periphery generally at the center of each edge toward the surface and thereby forming generally at the center of each edge at the inner periphery a region of minimal height above the surface and having a varying width that is at its minimum value at the center of each edge.

2. The cutting insert defined in claim 1 wherein the land forms at the cutting edges negative land angles that vary along the land.

3. The cutting insert defined in claim 2 wherein the land angle varies continuously along the land.

4. The cutting insert defined in claim 1 wherein the insert is formed with corners and the cutting edge includes a main cutting edge between the corners and secondary cutting edges extending back from the main cutting edge.

5. The cutting insert defined in claim 4 wherein the land is symmetrical with respect to a line perpendicular to the main cutting edge and equidistant between the corners.

6. The cutting insert defined in claim 1 wherein the insert is formed on the land with at least one chip-shaping formation.

7. The cutting insert defined in claim 6 wherein the formation is a bump.

8. The cutting insert defined in claim 6 wherein the formation is a recess.

9. The cutting insert defined in claim 6 wherein the formation is a raised chip breaker with an outwardly projecting rib-shaped wedge.

10. The cutting insert defined in claim 1 wherein the insert has side faces extending to the cutting edges and forming with the land a positive free angle of at least 0°.

11. The cutting insert defined in claim 1 wherein the land is annularly continuous and generally circular and the edges are arcuate.

12. The cutting insert defined in claim 11 wherein the insert has at least four such arcuate cutting edges each extending over an arc of about 90°.

13. The cutting insert defined in claim 11 wherein the insert is formed with respective chip-forming ribs directed outward at the centers of the cutting edges.

14. A cutting insert formed with:

a plurality of cutting edges each having a center;

a cutting surface spaced inward from the cutting edges; and a continuous land having an outer periphery at the cutting edges and a wholly curved and nonstraight inner periphery spaced inward therefrom and outwardly delimiting the cutting surface, the land dipping at the inner periphery generally at the center of each edge toward the surface and thereby forming generally at the center of each edge at the inner periphery a region of minimal height above the surface, the land forming a varying negative angle at the cutting edge and having a varying width that is at its minimum value at the center of each edge.

15. The cutting insert defined in claim 14 wherein the insert has at least three such cutting edges.

* * * * *